United States Patent
Ramarathinam et al.

(10) Patent No.: US 8,607,054 B2
(45) Date of Patent: Dec. 10, 2013

(54) REMOTE ACCESS TO HOSTED VIRTUAL MACHINES BY ENTERPRISE USERS

(75) Inventors: Aravind Ramarathinam, Redmond, WA (US); Srivatsan Parthasarathy, Bellevue, WA (US); Michael Michael, Houston, TX (US)

(73) Assignee: Microsoft Corporation, Redmond, WA (US)

( * ) Notice: Subject to any disclaimer, the term of this patent is extended or adjusted under 35 U.S.C. 154(b) by 306 days.

(21) Appl. No.: 12/905,889

(22) Filed: Oct. 15, 2010

(65) Prior Publication Data

US 2012/0096271 A1    Apr. 19, 2012

(51) Int. Cl.
    *H04L 29/00* (2006.01)
(52) U.S. Cl.
    USPC .................... 713/172; 726/4; 726/6; 709/227
(58) Field of Classification Search
    USPC ............................ 726/4, 6; 713/172; 709/227
    See application file for complete search history.

(56) References Cited

U.S. PATENT DOCUMENTS

| | | | |
|---|---|---|---|
| 7,243,369 B2 * | 7/2007 | Bhat et al. ......................... | 726/6 |
| 2005/0273844 A1 | 12/2005 | Dapkus et al. | |
| 2006/0090136 A1 | 4/2006 | Miller et al. | |
| 2007/0107048 A1 * | 5/2007 | Halls et al. ........................ | 726/4 |
| 2009/0183225 A1 | 7/2009 | Malakapalli et al. | |
| 2010/0125612 A1 | 5/2010 | Amradkar et al. | |
| 2010/0138830 A1 | 6/2010 | Astete et al. | |
| 2010/0169640 A1 | 7/2010 | Smith et al. | |

OTHER PUBLICATIONS

"Customizing RD Gateway Authentication and Authorization Schemes", www.blogs.msdn.com-b-rds-archive-2010-01-06-customizing-rd-gateway-authentication-and-authorization-schemes.aspx, accessed Jul. 28, 2010, 1 page.
"Designing Secure Multi-Tenancy into Virtualized Data Centers", www.cisco.com-en-US-docs-solutions-Enterprise-Data_Center-Virtualization-secureclb.html, accessed Jul. 28, 2010, 37 pages.
Blankenship, "Are you using TS Gateway?", www.dscoduc.com-2008-11-are-you-using-ts-gateway, accessed Jul. 28, 2010, 4 pages.

* cited by examiner

*Primary Examiner* — Brandon Hoffman
*Assistant Examiner* — Michael D Anderson
(74) *Attorney, Agent, or Firm* — Woodcock Washburn, LLP

(57) ABSTRACT

An end user of an enterprise is enabled to receive secure remote presentation access to the assigned virtual machines in a hosted public cloud through the cloud provider's virtualization hosts and remote presentation gateway. Thus an enterprise administrator may purchase computing capacity from the cloud provider and further sub-divide the purchased computing capacity among enterprise end users. The cloud provider need not create shadow accounts for each end user of the enterprise. The cloud provider AD and the enterprise AD do not need to trust each other. The cloud provider also need not expose host information to the tenants. Authorization may be provided by using a combination of a custom authorization plug-in at the terminal services gateway and an indirection listener component at the virtualization host. The host details may also be abstracted when the client connects to the remote presentation gateway so as to protect the fabric from attack and enabling the tenant virtual machines to freely move across the cloud provider's virtualization hosts.

20 Claims, 13 Drawing Sheets

REMOTE ACCESS TO HOSTED VIRTUAL MACHINES BY ENTERPRISE USERS

BACKGROUND

One increasingly popular form of networking may generally be referred to as remote presentation systems, which can use protocols such as Remote Desktop Protocol (remote presentation) and Independent Computing Architecture (ICA) to share a desktop and other applications executing on a server with a remote client. Such computing systems typically transmit the keyboard presses and mouse clicks or selections from the client to the server, relaying the screen updates back in the other direction over a network connection. As such, the user has the experience as if his or her machine is operating entirely locally, when in reality the client device is only sent screenshots of the desktop or applications as they appear on the server side.

Many enterprises that provide virtual machines to their users are purchasing computing capacity from public cloud providers. Cloud providers (also known as public hosters) sell computing capacity in the form of a virtual machine that the end user pays for on a "pay as you go" basis. Similarly, an enterprise can also purchase computing capacity from these cloud providers to extend its computing capacity. The cloud providers may use virtualization hosts to deploy virtual machines and sell virtual machines to the enterprise tenants. The virtualization hosts in the cloud provider's data center may be joined to the cloud provider's domain, whereas the tenant (purchaser of the cloud service's computing capacity) owns the actual virtual machines.

An enterprise tenant typically has many users. The tenant may further subdivide the computing capacity and assign individual virtual machines rented from the cloud to individual users from his enterprise. These users need access to those virtual machines in a similar way that they would access their local computers. For example, a remote desktop protocol may be used to access the virtual machines. At the service provider, the infrastructure ay be set up in such a way that all remote desktop access to the virtual machines is accomplished through the host computer.

Providing remote services through the cloud provider may provide some benefits such as:
1. Access may be provided even if the tenant virtual machine does not have a networking setup.
2. Access may be provided for a multiple operating system (OS) virtual machine workloads such as Windows, Linux, etc.
3. Ability to perform a manual/network OS install on the virtual machine.
4. Network connectivity between the cloud provider's gateway and the guest virtual machines is not needed, thus enabling isolation of the cloud provider's network and the tenant's network (guest virtual machines can further reside in their own isolated networks).

SUMMARY

One problem with the above scenario is that remote presentation access to virtual machines in the cloud through the cloud provider's virtualization hosts must be secured for an end user of the tenant's enterprise.

In various embodiments, methods and systems are disclosed for enabling an end user of the enterprise to receive secure remote presentation access to the assigned virtual machines in a hosted public cloud through the cloud provider's virtualization hosts and remote presentation gateway.

Thus an enterprise administrator may purchase computing capacity from the cloud provider and further sub-divide the purchased computing capacity among enterprise end users. The cloud provider need not create shadow accounts for each end user of an enterprise that is a consumer of the computing capacity. The cloud provider also need not expose host information to the tenants. The cloud provider also need not expose host information to the internet. In an embodiment, custom tokens signed with X.509 certificates may be used to secure the remote presentation access. In other embodiments, SAML tokens with security token service (STS) for identity federation may be used.

In one embodiment, authorization may be provided by using a combination of a custom authorization plug-in at the terminal services gateway and an indirection listener component at the virtualization host. The enterprise administrator may thus be able to further sub-divide the purchased public cloud capacity and assign tenant virtual machines among end users without requiring the public cloud provider (aka hoster) to create shadow accounts for each enterprise end user. The host details may also be abstracted when the client connects to the remote presentation gateway so as to protect the fabric from attack and enabling the tenant virtual machines to freely move across the cloud provider's virtualization hosts without impacting remote presentation access.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer readable media for graphics data for transmission to a remote computing device in accordance with this specification are further described with reference to the accompanying drawings in which.

DETAILED DESCRIPTION

Computing Environments In General Terms

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 1:
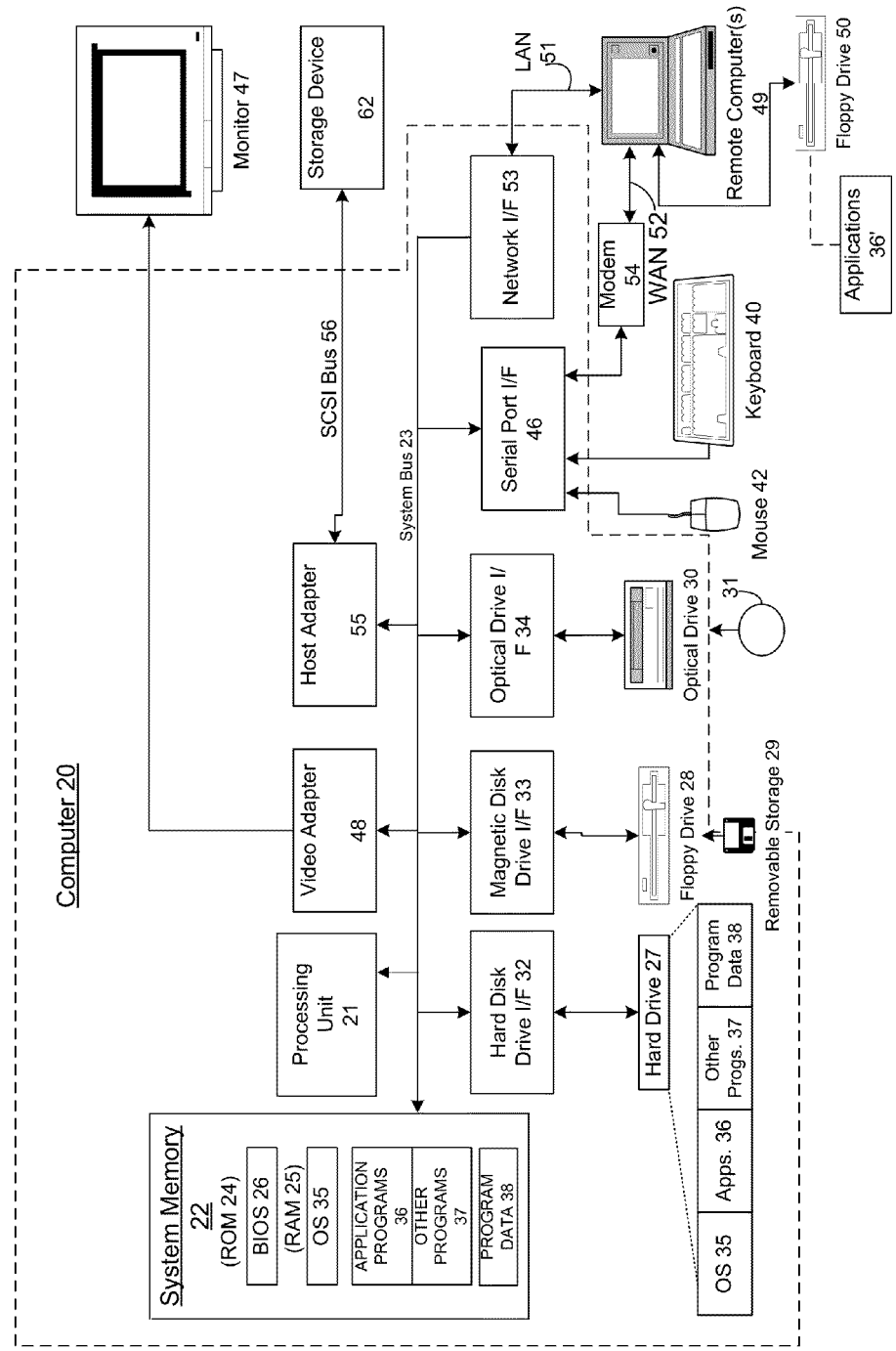
FIGS. 1 and 2 depict an example computer system wherein aspects of the present disclosure can be implemented.
Figure 2:
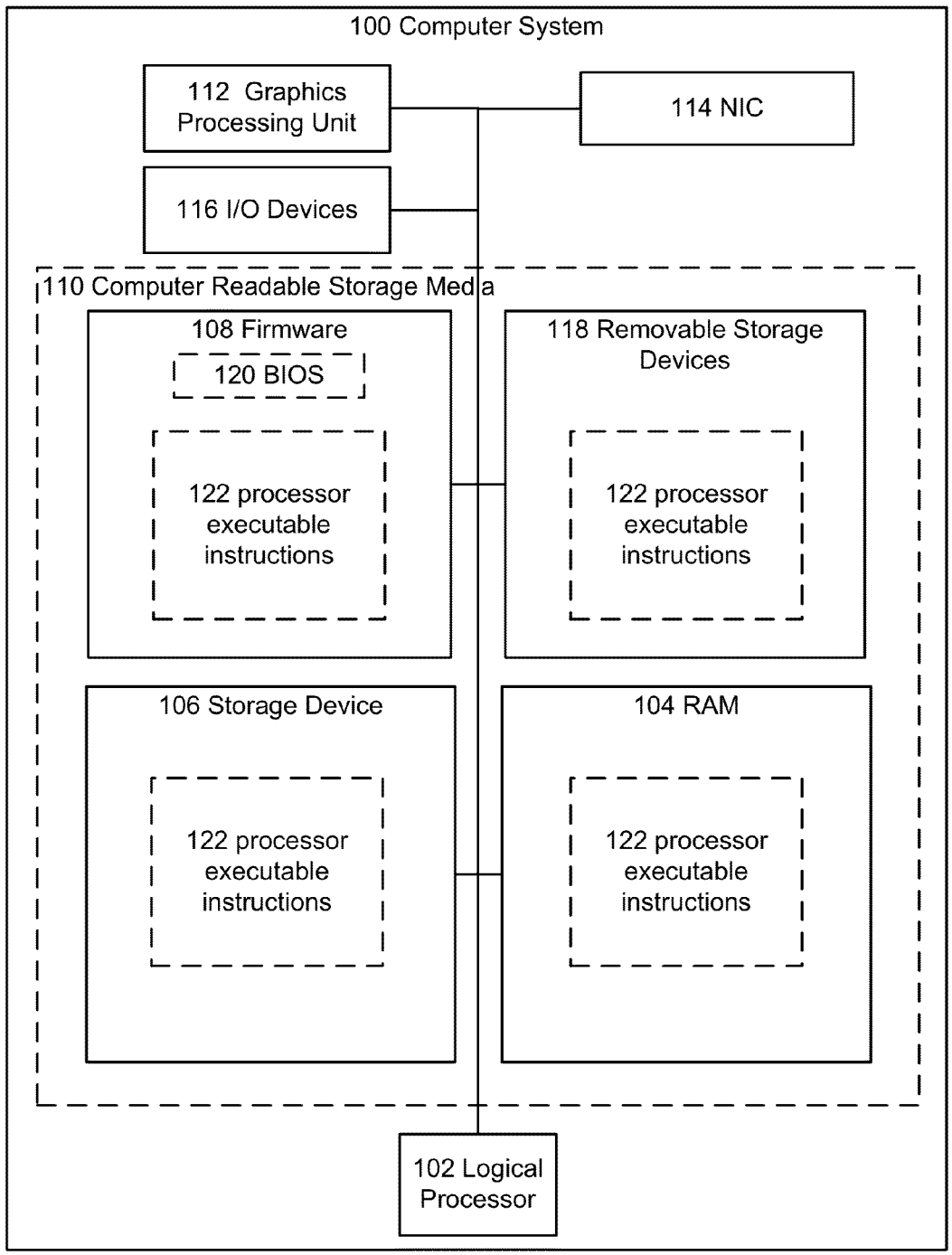

A remote desktop system is a computer system that maintains applications and operating systems that can be remotely executed by client computer systems. Input is entered at a client computer system and transferred over a network (e.g., using protocols based on the International Telecommunications Union (ITU) T.120 family of protocols such as Remote Desktop Protocol (remote presentation)) to an application on a terminal server. The application processes the input as if the input were entered at the terminal server. The application generates output in response to the received input and the output is transferred over the network to the client Embodiments may execute on one or more computers. FIGS. 1 and 2 and the following discussion are intended to provide a brief general description of a suitable computing environment in which the disclosure may be implemented. One skilled in the art can appreciate that computer systems 200, 300 can have some or all of the components described with respect to computer 100 of FIGS. 1 and 2.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38.

A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Referring now to FIG. 2, another embodiment of an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges.

The computer readable storage media provide non volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (remote presentation)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the remote presentation protocol by allowing plug-ins to transfer data over a remote presentation connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 3:
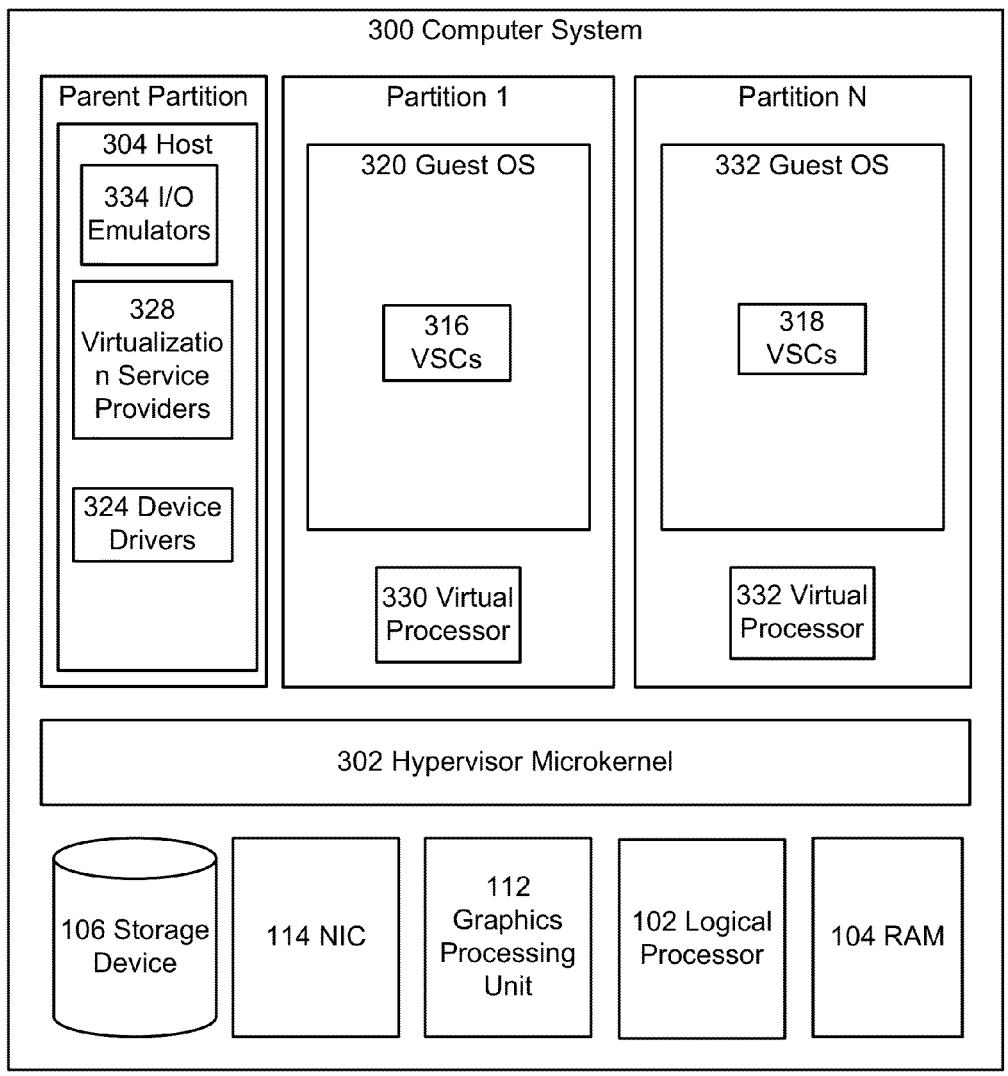
FIG. 3 depicts a virtualized operational environment for practicing aspects of the present disclosure.

Turning to FIG. 3, illustrated is an exemplary virtual machine server that can be used to generate virtual machines. In this embodiment, hypervisor microkernel 302 can be configured to control and arbitrate access to the hardware of computer system 300. Hypervisor microkernel 302 can isolate processes in one partition from accessing another partition's resources. For example, hypervisor microkernel 302 can generate execution environments called partitions such as child partition 1 through child partition N (where N is an integer greater than 1). In this embodiment, a child partition is the basic unit of isolation supported by hypervisor microkernel 302. Each child partition can be mapped to a set of hardware resources, e.g., memory, devices, logical processor cycles, etc., that is under control of the hypervisor microkernel 302. In embodiments hypervisor microkernel 302 can be a stand-alone software product, a part of an operating system, embedded within firmware of the motherboard, specialized integrated circuits, or a combination thereof.

Hypervisor microkernel 302 can enforce partitioning by restricting a guest operating system's view of the memory in a physical computer system. When hypervisor microkernel 302 instantiates a virtual machine, it can allocate pages, e.g., fixed length blocks of memory with starting and ending addresses, of system physical memory (SPM) to the virtual machine as guest physical memory (GPM). In this embodiment, the guest's restricted view of system memory is controlled by hypervisor microkernel 302. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host 304. Host 304 can be an operating system (or a set of configuration utilities) and host 304 can be configured to provide resources to guest operating systems executing in the child partitions 1-N by using virtualization service providers 328 (VSPs). VPSs 328, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in that they may be supplied with a hypervisor, not with a guest. In an exemplary embodiment the path used to by virtualization service providers 328 to communicate with virtualization service clients 316 and 318 can be thought of as the virtualization path.

As shown by the figure, emulators 334, e.g., virtualized IDE devices, virtualized video adaptors, virtualized NICs, etc., can be configured to run within host 304 and are attached to resources available to guest operating systems 330 and 322. For example, when a guest OS touches a memory location mapped to where a register of a device would be or memory mapped to a device, microkernel hypervisor 302 can intercept the request and pass the values the guest attempted to write to an associated emulator. The resources in this example can be thought of as where a virtual device is located. The use of emulators in this way can be considered the emulation path. The emulation path is inefficient compared to the virtualized path because it requires more CPU resources to emulate device than it does to pass messages between VSPs and VSCs. For example, the hundreds of actions on memory mapped to registers required in order to write a value to disk via the emulation path may be reduced to a single message passed from a VSC to a VSP in the virtualization path.

Each child partition can include one or more virtual processors (320 and 322) that guest operating systems (320 and 322) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems (320 and 322) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 4:
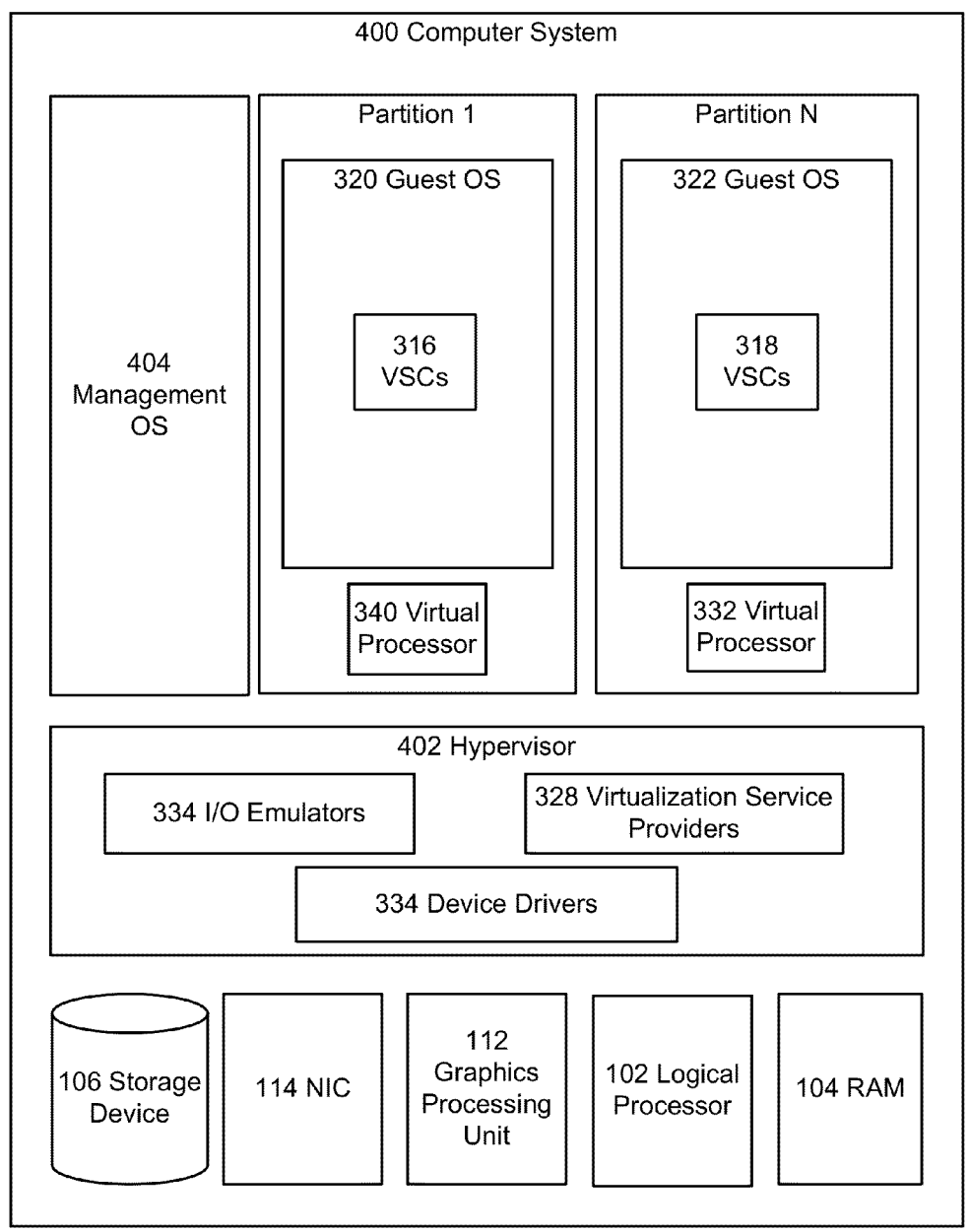
FIG. 4 depicts a virtualized operational environment for practicing aspects of the present disclosure.

Referring now to FIG. 4, illustrated is a virtual machine server based on an alternative architecture. FIG. 4 depicts similar components to those of FIG. 3; however, in this example embodiment hypervisor 402 can include a microkernel component and components similar to those in host 304 of FIG. 3 such as the virtualization service providers 328 and device drivers 324, while management operating system 404 may contain, for example, configuration utilities used to configure hypervisor 402. In this architecture, hypervisor 402 can perform the same or similar functions as hypervisor microkernel 302 of FIG. 3; however, in this architecture hypervisor 404 can be configured to provide resources to guest operating systems executing in the child partitions. Hypervisor 402 of FIG. 4 can be a stand alone software product, a part of an operating system, embedded within firmware of the motherboard or a portion of hypervisor 402 can be effectuated by specialized integrated circuits.

Figure 5:
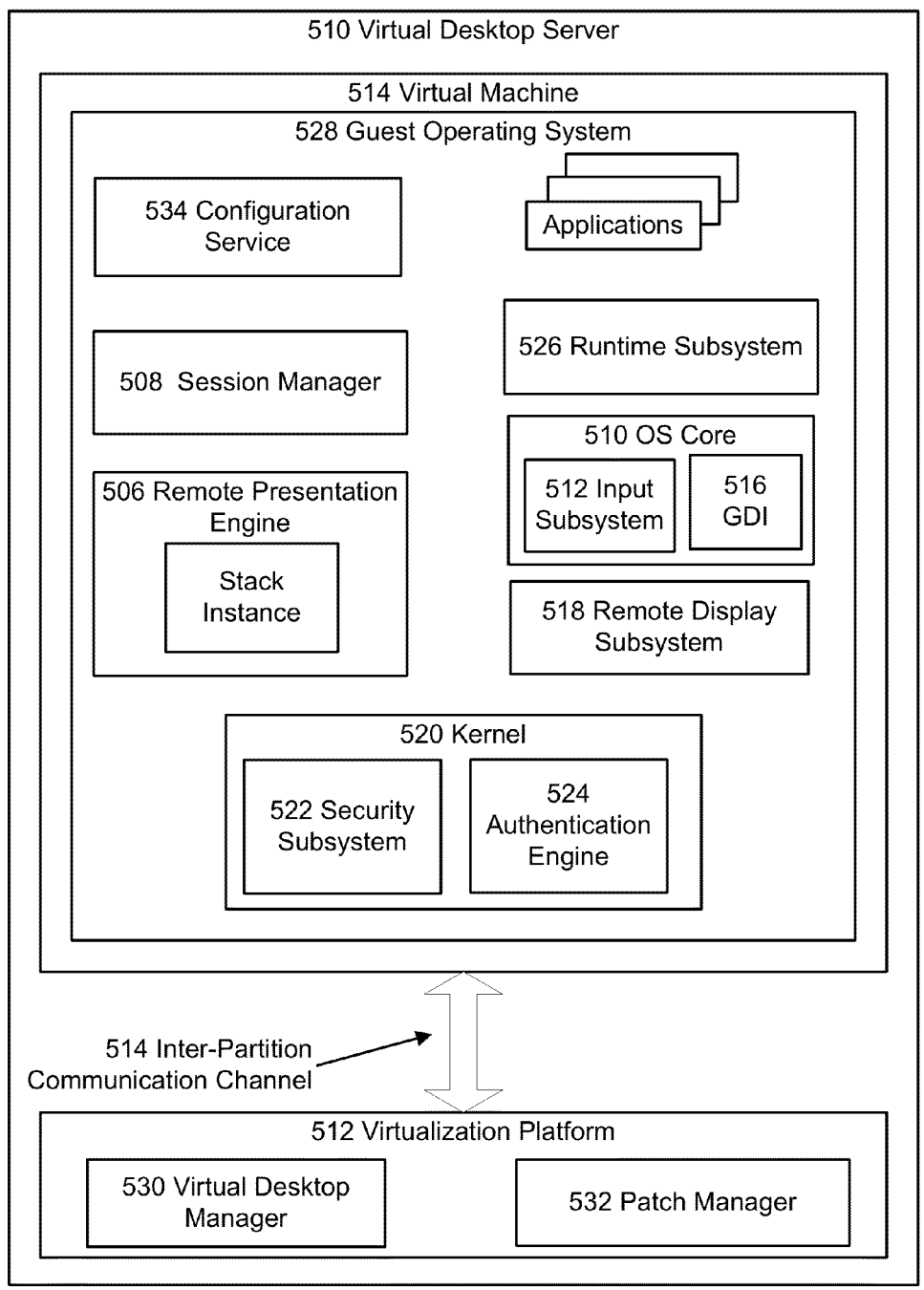
FIG. 5 illustrates a computer system including circuitry for effectuating remote desktop services.

Turning now to FIG. 5, illustrated is a high-level block diagram of virtual desktop server 500. In an embodiment, virtual desktop server 500 can be configured to deploy virtual desktop sessions (VDS) to clients, e.g., mobile devices such as smart phones, computer systems having components similar to those illustrated in FIG. 1, etc. Briefly, virtual desktop technology allows a user to remotely interact with a guest operating system running in a virtual machine. Unlike a remote desktop session, in a virtual desktop session only one user is logged into a guest operating system and can have total control of it, e.g., the user can run as an administrator and can have full rights on the guest. In the illustrated example, virtual desktop server 500 can have components similar to computer system 300 or 400 of FIG. 3 or FIG. 4. In the illustrated example, virtualization platform 502 is a logical abstraction of virtualization infrastructure components described above in FIG. 3 and FIG. 4. The functionality described in the following sections as "within" virtualization platform 502 can be implemented in one or more of the elements depicted in FIG. 3 or FIG. 4. For example, virtual desktop manager 530 could be implemented in a host 304 of FIG. 3. More specifically, virtual desktop manager 530 could be implemented in a host operating system running in the parent partition of a virtualized environment.

Starting a virtual desktop session requires instantiation of a guest operating system within a virtual machine. In an exemplary embodiment, virtual desktop manager 530, e.g., a module of processor executable instructions, can start up virtual machine 514 (along with guest operating system 528) in response to a request. Virtual desktop manager 530 can execute on a logical processor and instruct virtualization platform 502, e.g., microkernel hypervisor 202, to allocate memory for a partition. Virtualization platform 502 can execute and set virtual devices up within virtual machine 514 and load a boot loader program into virtual machine memory. The boot loader program can execute on a virtual processor and load guest operating system 528. For example, session manager 508 can be loaded, which can instantiate environment subsystems such as runtime subsystem 526 that can include a kernel mode part such as operating system core 510.

For example, the environment subsystems in an embodiment can be configured to expose a subset of services to application programs and provide an access point to kernel 520. When guest operating system 528 is loaded, the boot loader program can exit and turn control of the virtual machine over to guest operating system 528. Guest operating system 528 can execute the various modules illustrated in FIG. 5 and configure itself to host a virtual desktop session. For example, guest operating system 528 can include registry values that cause remote presentation engine 506 and/or configuration service 534 to start upon boot.

A virtual desktop session can start when guest operating system 528 receives a connection request over a network from a client. A connection request can first be handled by remote presentation engine 506. The remote presentation engine 506 can be configured to listen for connection messages and forward them to session manager 508. As illustrated by FIG. 3, when sessions are generated the remote presentation engine 506 can run a protocol stack instances for the session. Generally, the protocol stack instance can be configured to route user interface output to an associated client and route user input received from the associated client to operating system core 510. Briefly, operating system core 510 can be configured to manage screen output; collect input from keyboards, mice, and other devices.

A user credential, e.g., a username/password combination, can be received by remote presentation engine 506 and passed to session manager 508. Session manager 508 can pass the credential to a logon procedure, which can route the credential to authentication engine 524 for verification. Authentication engine 524 can generate a system token, which can be used whenever a user attempts to execute a process to determine whether the user has the security credentials to run the process or thread. For example, when a process or thread attempts to gain access, e.g., open, close, delete, and/or modify an object, e.g., a file, setting, or an application, the thread or process can be authenticated by security subsystem 522. Security subsystem 522 can check the system token against an access control list associated with the object and determine whether the thread has permission based on a comparison of information in the system token and the access control list. If security subsystem 522 determines that the thread is authorized then the thread can be allowed to access the object.

Continuing with the description of FIG. 5, in an embodiment the operating system core 510 can include a graphics display interface 516 (GDI) and input subsystem 512. Input subsystem 512 in an example embodiment can be configured to receive user input from a client via the protocol stack instance for the virtual desktop session and send the input to operating system core 510. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the operating system core 510 and the input subsystem 512 can be configured to determine that an icon is located at the coordinates associated with the double-click. Input subsystem 512 can then be configured to send a notification to runtime subsystem 526 that can execute a process for the application associated with the icon.

Draw commands can be received from applications and/or a desktop and processed by GDI 516. GDI 516 in general can include a process that can generate graphical object draw commands. GDI 516 in this example embodiment can be configured to pass the commands to remote display subsystem 518 that can instantiate a display driver for the session.

In an example embodiment remote display subsystem 518 can be configured to include virtual display driver(s) that can be configured to receive the draw commands and send them to the client.

Also shown in FIG. 5 is a configuration service 534. In an exemplary embodiment, configuration service 534 can be used to setup guest operating system 528 to conduct virtual desktop sessions prior to connection by a client. For example, configuration service 534 can run within guest operating system 528 and be executed when guest operating system 528 boots. Since certain configuration settings require administrative privileges, configuration service 534 can be configured to run as a process with system wide privileges. Some of the exemplary actions configuration service 534 can take include, but are not limited to, actions that add an account identifier for the user to a list of administrative users for guest operating system 528, add the account identifier to a list of authorized virtual desktop users, set registry values, open guest operating system firewalls, and open the port that remote presentation engine 506 listens for connections on. Configuration service 534 is described in more detail in the following paragraphs.

In an exemplary embodiment, a communication channel can be established between virtualization platform 502 and guest operating system 528 in order to configure and control guest operating system 528. Since a remote user can have complete control of virtual machine 514, security needs to be in place to ensure that any channel used to configure and control guest operating system 528 can not also be used to attack virtualization platform 502 or other computer systems connected to an internal network. Traditionally, a networked communication channel is used to setup and control guest operating system 528. Network channels, however are difficult to deploy when guest operating system 528 is not in the same network domain as virtualization platform 502 and virtualization platform 502 is configured to deny incoming connection requests from outside the domain.

In an exemplary embodiment, inter-partition communication channel 504 can be used to communicate with configuration server 534 in order to configure and/or manage the virtual desktop session. Inter-partition communication channel 504 can be configured to be implicitly trusted by virtual machine 514 and not trusted by virtualization platform 502. In this example, information, e.g., data and/or commands can be easily routed to guest operating system 528 without any need to verify the information. On the other hand, data received from virtual machine 514 can be verified and authenticated before virtualization platform 502 takes an action. Moreover, because inter-partition communication channel 504 does not use networking, guest operating system 528 can be kept off the internal network.

Inter-partition communication channel 504 can be implicitly trusted by virtual machine 514, i.e., information received via the channel is inherently authenticated/validated, because only virtualization platform 502 can create inter-partition communication channel 504. For example, in an embodiment inter-partition communication channel 504 can be implemented at least in part as a region of memory shared between virtual machine 514 and virtualization platform 502. Virtualization platform 502 can cause a data structure indicative of a ring buffer or the like to be created in region of shared memory that can be used as a full-duplex communication channel between virtualization platform 502 and virtual machine 514. In an exemplary embodiment, the inter-partition communication channel can include features described in U.S. Pat. No. 7,689,800 entitled "Partition bus," the contents of which are herein incorporated by reference in its entirety.

Virtualization platform 502 can write information to inter-partition communication channel 504 that can be read by virtual machine 514. In an exemplary embodiment, inter-partition communication channel 504 can be message based. That is, virtualization platform 502 and virtual machine 514 can be configured to write packets of data to inter-partition communication channel 504. In the same, or another exemplary embodiment, inter-partition communication channel 504 can be event driven. In this configuration, when information is written to the channel, the receiver can be instructed to read the information from inter-partition communication channel 504 by for example, hypervisor 302 of FIG. 3.

Figure 6:
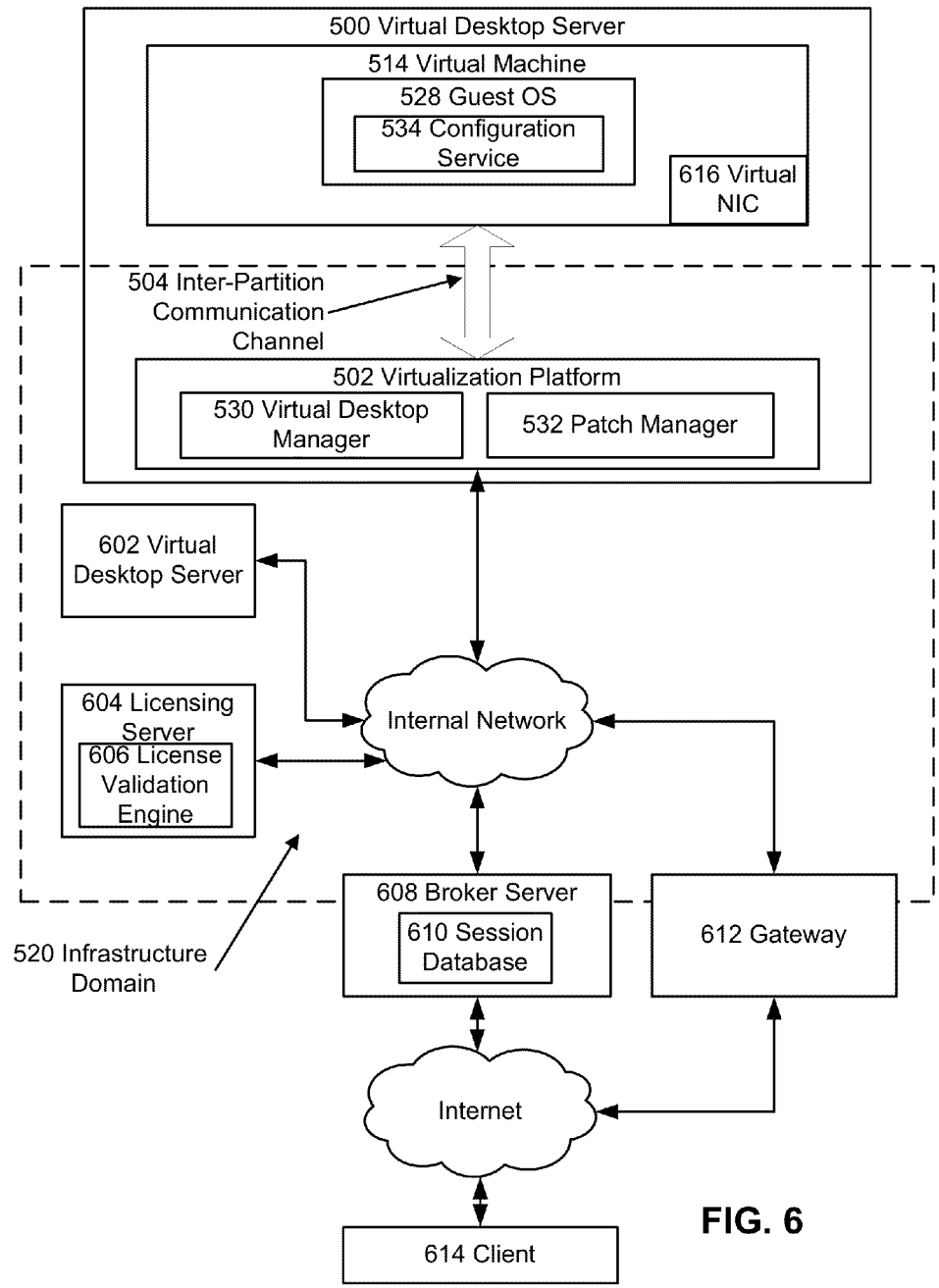
FIG. 6 depicts an operational environment for practicing aspects of the present disclosure.

Turning now to FIG. 6, illustrated is a high-level block diagram of a datacenter including virtual desktop server 500, virtual desktop server 602, licensing server 604, broker server 608, gateway 612, and client 614. The datacenter can be configured to deploy virtual desktop sessions to clients. In the illustrated example, virtualization platform 502, virtual desktop server 602, licensing server 604, broker server 608, and gateway 612 can be part of an intranet and the user credentials used to log into these computers can be members of the same domain, i.e., the infrastructure domain 520. Infrastructure domain 520 is shown in dashed lines cutting virtual desktop server 500 in half to illustrate that in an exemplary embodiment, virtual machine 514 can be part of a different domain or part of no domain. Furthermore, virtual machine 514 can be part of a different network or part of no network at all.

The datacenter can include an internal network coupling a plurality of virtual desktop servers (602 and 500), which can include components similar to those illustrated by FIG. 3 or 4, to broker server 608 and licensing server 604. As one of skill in the art can appreciate, while two virtual desktop servers are shown the datacenter can have many more. Also, while virtual desktop server 500 is illustrated running one virtual machine (514), each virtual desktop server can simultaneously host many virtual machines. Or put another way, the datacenter can have M (where M is an integer greater than 1) virtual desktop servers and each of the M virtualization hosts can host N (where N is also an integer greater than 1) virtual machines.

Broker server 608 can act as an interface to the intranet for client 614. Briefly, broker server 608 can include components similar to the components described with respect to FIG. 2. Broker server 608 can have a network adapter that interfaces it to a public network, such as the Internet, and another network adapter that interfaces it to the internal network, i.e., the intranet. In this example, broker server 608 can act as a gateway for the internal network, thereby allowing virtual desktop servers and licensing server 604 to be kept off the public network.

When user of client 614 wants a virtual desktop session, he or she can click on an icon and client 614 can send one or more packets of information to broker server 608. Broker server 608 can include a module of software instructions that upon execution cause a logical processor to select a suitable virtualization host to instantiate a virtual machine to host the virtual desktop session. A user credential, e.g., a username and password combination, can be collected and broker server 608 can check session database 610 to determine whether the datacenter includes any disconnected virtual desktop sessions associated with the user credential such as a username/password combination. If session database 610 includes a disconnected virtual desktop session associated with the user credential, broker server 608 can send a signal to the virtualization host that has the disconnected session and instruct it to execute the virtual machine. If session database 610 does not have information indicative of a disconnected session for the user, broker server 608 can select a suitable virtual desktop server, e.g., one that has the resources available to instantiate a virtual machine to host a virtual desktop session.

Virtualization platform 502 can instantiate virtual machine 514 and execute guest operating system 528 on a virtual processor. Referring back to FIG. 5, guest operating system 528 can run remote presentation engine 506; return an internet protocol (IP) address of virtual NIC 616 to broker server 608; and await a connection from client 614. Broker server 608 can return the IP address of virtual NIC 616 to client 614 in a packet of information that causes a logical processor of client 614 to redirect client to the IP address virtual machine 514. Gateway 612 can receive the connection request and forward it to virtual NIC 616.

In an least one exemplary embodiment, session manager 508 can be configured to check to see if the client 614 is associated with a valid license before starting the virtual desktop session. Remote presentation engine 506 can receive a license from client 614 (or information associated with a license) and send the information to virtualization platform 502, which can send the license (or the information associated with the license) to licensing server 604. Licensing server 604 can include license validation engine 606, which can be configured to determine whether a license associated with client 614 is valid. If the license is valid, license validation engine 606 can send a signal back virtual desktop server 500 and a virtual desktop session can be started. At this point, remote presentation engine 506 can stream one or more packets of information indicative of a graphical user interface for guest operating system 528 to client 614 and receive one or more packets of information indicative of user input from client 614.

In an exemplary embodiment, when virtualization platform 502 receives a request from broker server 608 to instantiate a virtual machine, virtual desktop manager 530 can execute and send commands and/or information via inter-partition communication channel 504 to virtual machine 514 to cause guest operating system 528 to be configured to conduct a virtual desktop session. Configuration service 534 can receive the commands and/or information and configure guest operating system 528 accordingly. For example, virtual desktop manager 530 can send the identity of the user attempting to connect, desired settings for a firewall protecting guest operating system 528, registry values, a list of applications the user is allowed to operate, commands to enable virtual desktop sessions and to add the identity of the user to a list of authorized virtual desktop users, etc. Configuration service 534 can execute on a virtual processor and change appropriate settings.

Once the virtual desktop session is running, virtual desktop manager 530 can manage a running virtual desktop session via inter-partition communication channel 504. For example, virtual desktop manager 530 can issue commands to virtual machine 514 such as commands that cause the guest operating system 528 to shut down, disconnect the user, reset the guest operating system 528, etc. In the same, or another embodiment, virtual desktop manager 530 can manage the virtual desktop session receive state information for virtual machine 514, status information from remote presentation engine 506, and/or send commands to control the virtual desktop session to configuration service 534. For example, virtual desktop manager 530 can receive state information for virtual machine 514 that indicates whether virtual machine 514 is running, paused, ready, booting, as well as a list of IP addresses that can be sent to the client. In addition, virtual desktop manager 530 can receive status information for guest operating system 528 such as the identity of the user that is logged in for the virtual desktop session, and communicate some or all of this information to broker server 608.

Figure 7:
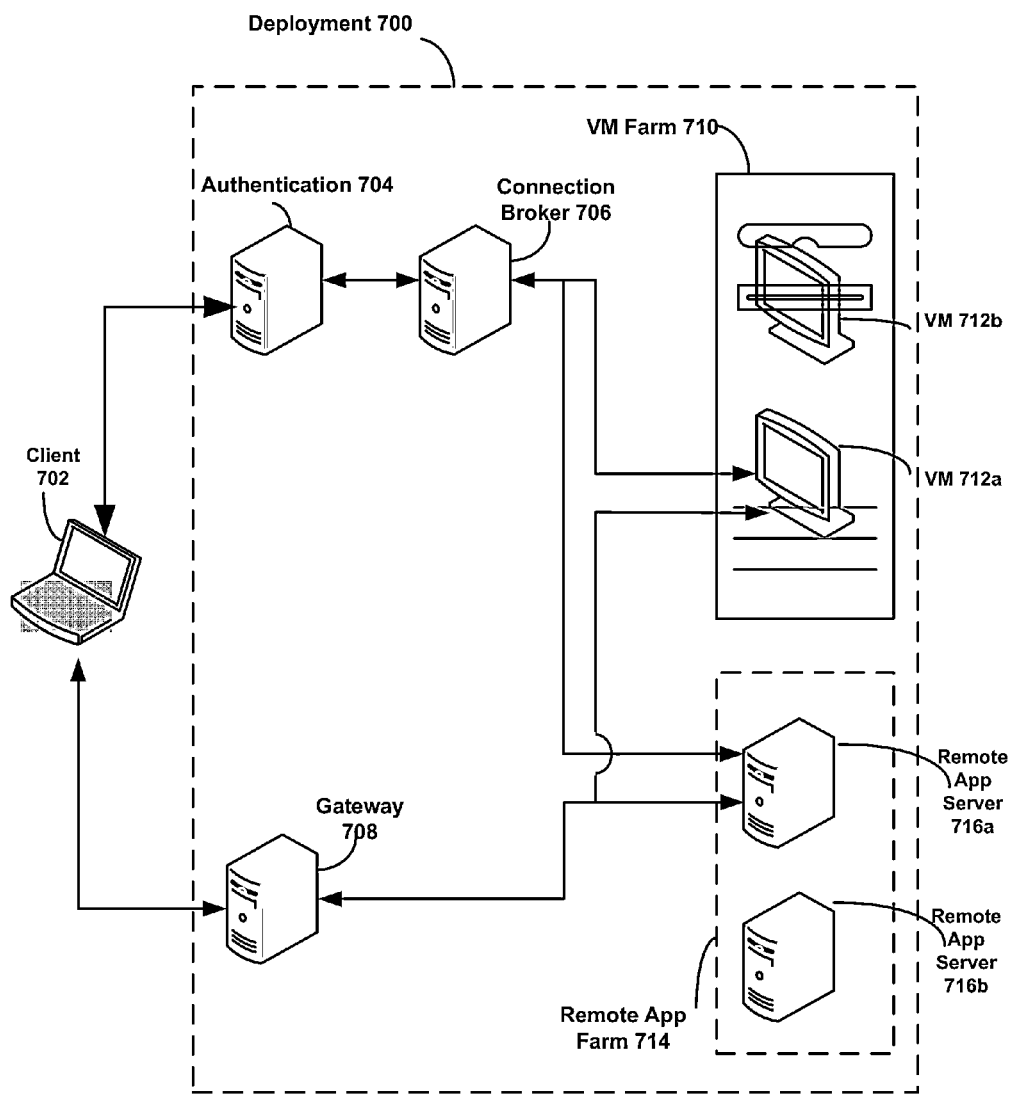
FIG. 7 depicts an operational environment for practicing aspects of the present disclosure.

FIG. 7 depicts an example system where a client has a workspace that comprises remote sessions with a plurality of servers.

The computers depicted in FIG. 7 may be similar to the computer depicted in FIG. 1. In FIG. 7, a client 702 communicates with a deployment 700, which comprises authentication server 704, connection broker 708, gateway 708, remote application server farm 714 (which in turn comprises two homogenously configured servers, remote application servers 716a-b), and VM server farm 710 (which in turn comprises two homogenously configured VMs, VMs 712a-b).

Client 702 has a workspace that comprises multiple remote resources served by one or more of remote application servers 716 and VMs 712. Client 702 may log into its workspace through an authentication server 704. Once authenticated, the client's request to connect to its workspace is transmitted from authentication server 704 to connection broker 706. Connection broker 706 is configured to broker connections between client 702 and the application servers 716 and VMs 712 that will serve remote resources with client 702, and to effectuate this, connection broker 706 is configured to communicate with application servers 716 and VMs 712 to determine what resources they are currently serving (including disconnected remote resources for a user of client 702).

Client 702 may have a workspace that comprises multiple remote resources—a remote resource comprising a remote application from remote application server 716a, and a remote resource that comprises a VM from VM 712a. As depicted, client 702 does not have a remote resource with remote application server 716b or VM 712b. These may each serve different applications or desktops, versions of an application, or other permutations. For instance, remote application server 716a may be serving client 702 with a remoted word processor application, and VM 712 may be serving client 702 with a remote desktop.

As can be seen through this depiction, when a user wishes to reconnect back to his or her workspace, he may desire to reconnect to the remote resources of both remote application server 716a and VM 712a through one command, rather than through one command performed three times. The user may perform this reconnect operation from client 702, or from another client computer (such as where client 702 is the user's computer at work, and the user wishes to reconnect from a computer at home during the weekend).

Figure 8:
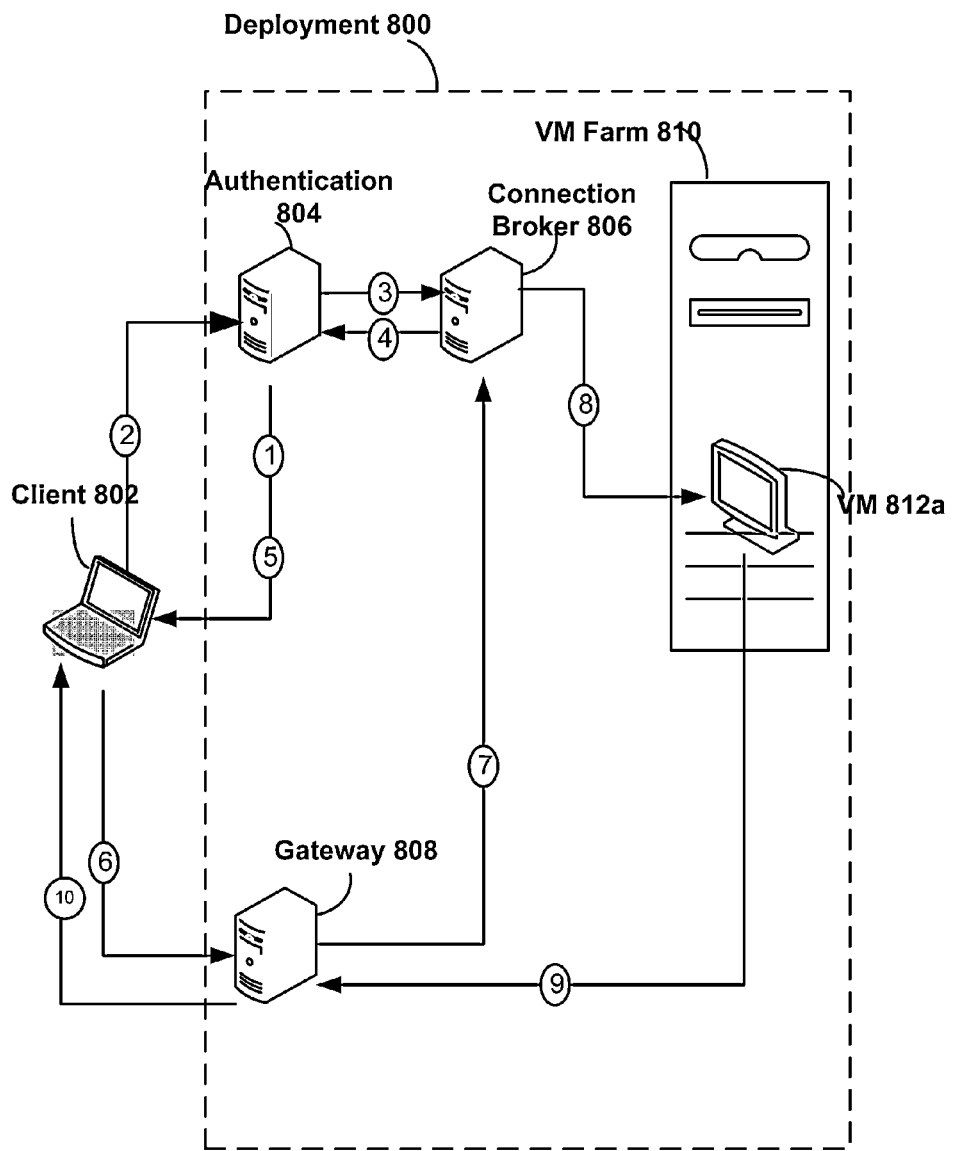
FIG. 8 depicts an operational environment for practicing aspects of the present disclosure.

FIG. 8 depicts an example an example communication flow for a client reconnecting to a remote resource of a workspace.

FIG. 8 depicts an example communication flow in a system where a client reconnects a workspace that comprises remote sessions with a plurality of servers. This communication flow may be effectuated in a system, such as the computer system depicted in FIG. 7. To wit, remote deployment 800, client 802, authentication server 804, connection broker 806, gateway 808, VM farm 810 and VM 812a of FIG. 8 may be similar to remote deployment 200, client 202, authentication server 204, connection broker 206, gateway 208, VM farm 210 and VM 212a, respectively, of FIG. 7.

A user of client 802 has previously had a workspace to remote server farm 800 that involved accessing a remote resource from VM 812a, and this workspace is now disconnected. Before client 802 even attempts to reconnect to the deployment 800, authentication server 804 publishes a document (via communication (1)) to client 802 identifying information about the deployment 800 that client 802 may use to access the remote resources of the deployment 800. Client 802 later reconnects by sending communication (2) to authentication server 804. Authentication server 804 validates credentials of the user and/or client (such as a login and password). Where the credentials are validated, authentication server 804 communicates with connection broker 806 to determine which remote resources (here, VM 812a) client 802 is to reconnect to when reconnecting its workspace. Authentication server 804 makes this determination by sending communication (3) to connection broker 806, and, in response, receiving back in communication (4) a list of server farms (here, VM farm 810) for client 802 to reconnect to. This information indicated in communication (4) is passed by authentication server 804 to client 802 in communication (5).

When client 802 has the list of servers to reconnect to from authentication server 804, client 802 reestablishes a communication with each of those server farms. As depicted in FIG. 8, that server farm is VM farm 810. Client 802 does not have the ability to directly contact either connection broker 806 or VM farm 810. Gateway 808 is thus used at the edge of the networked environment to facilitate the request and transcend the network boundaries. Client 802 communicates (6) with gateway 808 to access the remote resources of these server farms. Gateway 808 processes communication (6), and in turn communicates (7) with connection broker 806 to convey similar information. Connection broker 806 takes the identification of the server farm from communication (7) and from it, identifies the machine (VM 812a) within the farm 810 that has that disconnected remote resource. Connection broker 806 sends communication (8) to VM 812a, instructing VM 812a to reconnect the remote resource to client 802. VM 812a reconnects with client 802 by sending a communication (9) indicative of the same to gateway 808, which, in turn sends a communication (10) indicative of the same to client 802.

It may be appreciated that this is a simplified diagram to emphasize the present invention, and that more or fewer server farms may be present and/or reconnected to, and that the communications passed may be more involved (for instance, it is shown that communications (9) and (10) establish a reconnection between VM 812a and client 802, where this may also involve communications that are send from client 802 through gateway 808 and to VM 812a).

All of these variations for implementing the above mentioned virtual machines are just exemplary implementations, and nothing herein should be interpreted as limiting the disclosure to any particular virtualization aspect.

Remote Access to Hosted Virtual Machines by Enterprise Users

Many enterprises that provide virtual machines to their users are purchasing computing capacity from public cloud providers. Cloud providers (also known as public hosters) sell computing capacity in the form of a virtual machine that the end user pays for on a "pay as you go" basis. Similarly, an enterprise can also purchase computing capacity from these cloud providers to extend its computing capacity. The cloud providers may use virtualization hosts to deploy virtual machines and sell virtual machines to the enterprise tenants. The virtualization hosts in the cloud provider's data center may be joined to the cloud provider's domain, whereas the tenant (purchaser of the cloud service's computing capacity) owns the actual virtual machines.

An enterprise tenant typically has many users. The tenant may further subdivide the computing capacity and assign individual virtual machines rented from the cloud to individual users from his enterprise. These users need access to those virtual machines in a similar way that they would access their local computers. For example, a remote desktop protocol may be used to access the virtual machines. At the service provider, the infrastructure may be set up in such a way that all remote desktop access to the virtual machines is accomplished through the host computer.

As described above, a domain may be a logical group of computers that share a central directory database. This central directory (e.g., Active Directory) contains user accounts and security information for the resources in that domain. Each user within a domain may receive a unique account or user name. This account can then be assigned access to resources within the domain. Computers inside a domain can be assigned into organizational units according to location, organizational structure, or other factors. Computers can connect to a domain via LAN or via WAN using a VPN connection. The domain may provide support for a certification authority to confirm identities.

Providing remote services through the cloud provider may provide some benefits such as:
1. Access may be provided even if the tenant virtual machine does not have a networking setup.
2. Access may be provided for a multiple operating system (OS) virtual machine workloads such as Windows, Linux, etc.
3. Ability to perform a manual/network OS install on the virtual machine.
4. Network connectivity between the cloud provider's gateway and the guest virtual machines is not needed, thus enabling isolation of the cloud provider's and tenant's networks (guest virtual machines can be in their own isolated networks).

One problem with the above scenario is that remote presentation access to virtual machines in the cloud through the cloud provider's virtualization hosts must be secured for an end user of the tenant enterprise. Typically such virtual machines are secured using credentials from the hoster's domain. However, the actual consumer (i.e. the client) of the virtual machine does not have access to those credentials because access to this virtual machine was sub-delegated to them.

In various embodiments, methods and systems are disclosed for enabling an end user of the enterprise to receive secure remote presentation access to the assigned virtual machines in a hosted public cloud through the cloud provider's virtualization hosts and remote presentation gateway. Thus an enterprise administrator may purchase computing capacity from the cloud provider and further sub-divide the purchased computing capacity among enterprise end users. The cloud provider need not create shadow accounts for each end user of the enterprise. The cloud provider also need not expose host information to the tenants. In an embodiment, custom tokens signed with X.509 certificates may be used. In other embodiments, SAML tokens with STS for identity federation may be used.

In one embodiment, authorization may be provided by using a combination of a custom authorization plug-in at the terminal services gateway and an indirection listener component at the virtualization host. The enterprise administrator may thus be able to further sub-divide the purchased public cloud capacity and assign tenant virtual machines among end users without creating shadow accounts for each end user. The host details may also be abstracted when the client connects to the remote presentation gateway so as to protect the hoster's fabric from attack and enabling the tenant virtual machines to freely move across the cloud provider's virtualization hosts.

In various embodiments, the following characteristics may be incorporated.

1. Either SAML tokens/STS or Custom tokens/X.509 Certificates may be used. Security Assertion Markup Language (SAML) is an XML-based standard for exchanging authentication and authorization data between security domains. The security domains are typically an identity provider and a service provider. X.509 is an ITU-T standard for a public key infrastructure for single sign-on (SSO) and Privilege Management Infrastructure (PMI).

2. The cloud provider need not create shadow accounts in the cloud provider's Active Directory for each end user of the enterprise.

3. The enterprise administrator who purchases the capacity from the cloud provider may further sub-divide the cloud resources among end users of the enterprise. Each end user should have access only to the virtual machines assigned to the user by the enterprise administrator. The cloud provider assigns virtual machines to the enterprise administrator and the enterprise administrator in turn further sub-divides the virtual machines among the end users of that enterprise. The end user does not have direct access to the virtual machine.

4. The cloud provider need not expose host information. Tenant virtual machines can be migrated freely within cloud provider's virtualization hosts.

5. The cloud provider's hosts are not exposed directly to the internet and will be shielded through the remote presentation gateway.

6. The end user client of the enterprise does not proxy through an enterprise server but communicates directly with the cloud provider's remote presentation gateway.

7. Tenant virtual machines can be in their own isolated networks or can be any other networking configuration, including having no network connection at all.

8. Remote desktop traffic data may be SSL/TLS encrypted.

9. Multi-tenant scenarios should be supported. The remote presentation gateway should be shared among different tenants. Many enterprises can purchase capacity from a service provider and act as tenants. Furthermore, such enterprises can sub-divide the capacity across their respective end users.

10. The solution should be scalable.

A self service portal may be a web component that extends management of virtual machines to end users. The self-service portal may be a extensible component built on top of a virtualization system. The self-service portal can be used to pool, allocate, and manage resources to offer infrastructure as a service and to deliver the foundation for a private cloud platform inside the enterprise. The self service portal extends the assignment of virtual machines to end users. The self-service portal may include a web-based user interface that includes sections for datacenter managers and business unit IT consumers. The self-service portal may include a dynamic provisioning engine, and may reduce the time needed to provision infrastructures and their components by offering business unit on-boarding and infrastructure request and change management.

In an embodiment, the terminal service gateway can have a custom authentication and authorization plug-in. When a client requests a remote desktop, the client can send a cookie with their credentials. The plug-in can authenticate the cookie and authorize the caller. An additional authorization may be needed at the virtualization host to authorize access to a specific virtual machine. In one embodiment, this can be achieved with an intermediary listening service on a host. All the above are needed for a secure connection.

In an embodiment, an enterprise end user may use an authentication mechanism for logging into the self-service portal of the enterprise. For example, the enterprise user may use Kerberos authentication to log into the self-service portal.

More generally, when an enterprise purchases capacity from a cloud provider the cloud provider has its own domain and active directory. The enterprise has its own domain and active directory. Accordingly, the enterprise and cloud provider need not have trust between them. Thus is it desirable for the user in the enterprise to connect to the virtual machine that the user owns at the cloud provider.

In an embodiment, it is further desirable that existing enterprise components and capabilities, such as the terminal services gateway and existing remote presentation protocols such as RDP, are utilized.

In an embodiment, a cookie is created that includes claims that are needed by the custom authorization plug-in.

One problem is that some systems may be designed for remote presentation access to a guest OS directly but not for remote presentation access to the host.

Another problem is how to achieve a remote console connection to a virtual machine through a non-trusted domain.

In one embodiment, the terminal services gateway may provide a pluggable authentication and authorization module to support an authentication mechanism. The client can send an arbitrary array of bytes through a cookie to the terminal services gateway. The terminal services gateway can notify a custom resource authorization plug-in (part of the pluggable authentication and authorization module) with the name of the target resource before allowing the connection. While this may work in the case of a remote session to the target machine, when this is used for console access to guest virtual machines through the virtualization host's single port listener service, the target resource specified is the virtualization host. However, the real target is the virtual machine running on the virtualization host.

An end user can connect to his virtual in at least two ways: (a) directly by using remote desktop into the virtual machine, or (b) by leveraging a single port listener (SPL). If the end user is using the single port listener, then the user connects to a host computer port. The host authenticates using CredSSP and validates that this user has access to the virtual machine they want to connect to. The host then redirects the remote desktop session to the virtual machine through a private interface on the host. The component that performs these functions is called the single port listener. The single port listener allows a VMM to connect to any virtual machine through a host connection without imposing any networking requirements on the virtual machine. The single port listener may also allow an end user to connect to the portal from a client computer using a browser such as Internet Explorer. The end user can then chose to connect to a virtual machine and view the console session.

The virtual machine ID may be passed (e.g., in a pre-connection blob) to the virtualization host's single port listener at the destination as part of the remote presentation protocol. Since the pre-connection blob may not be exposed at the custom resource authorization plug-in, a full virtual machine level granular authorization using either SAML tokens or custom certificate tokens sent as a cookie to the terminal services gateway may not be possible. The custom resource authorization plug-in needs to have access to the pre-connection blob for the connection in order to validate it as part of the connection's resource authorization. The authorization plug-in needs to validate the information present in the cookie with the actual target resource being accessed. The target virtual machine ID can be retrieved through the cookie, but authorization that the target connection from the gateway is actually that virtual machine is still needed.

The custom resource authorization module at the RD Gateway is only aware of the target virtualization host and a port to access. The "real target" is the guest virtual machine running in the virtualization host. For example, a malicious user could present a signed claim to the terminal services gateway's authorization plug-in requesting access to a virtual machine running in the host. The user can specify the pre-connection blob to point to another virtual machine running in the same host. The gateway's authorization plug-in cannot "cross-check" the claims with the actual target virtual machine running in the same host.

Figure 9:
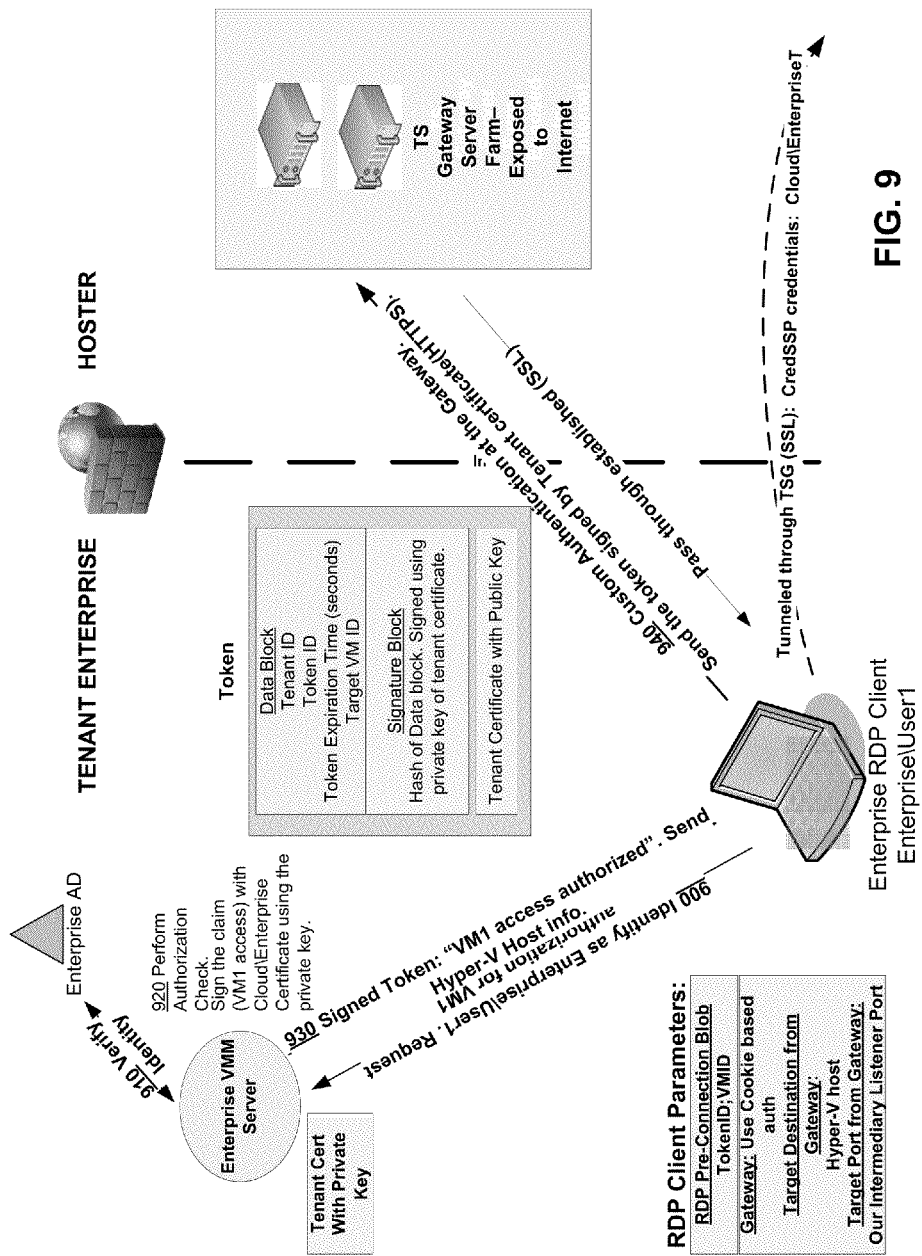
FIGS. 9-11 illustrates an example operational procedure for practicing aspects of the present disclosure.
Figure 10:
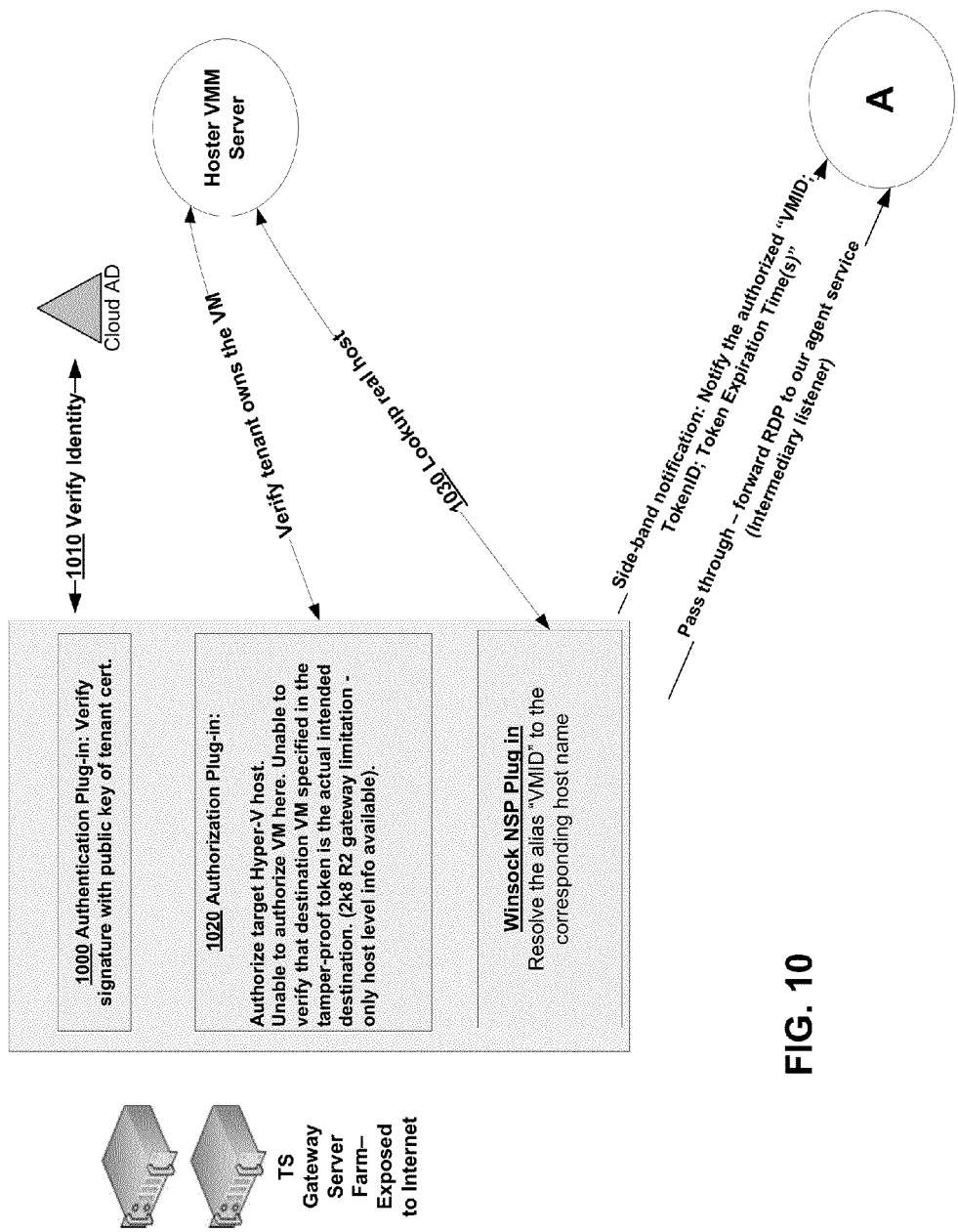
Figure 11:
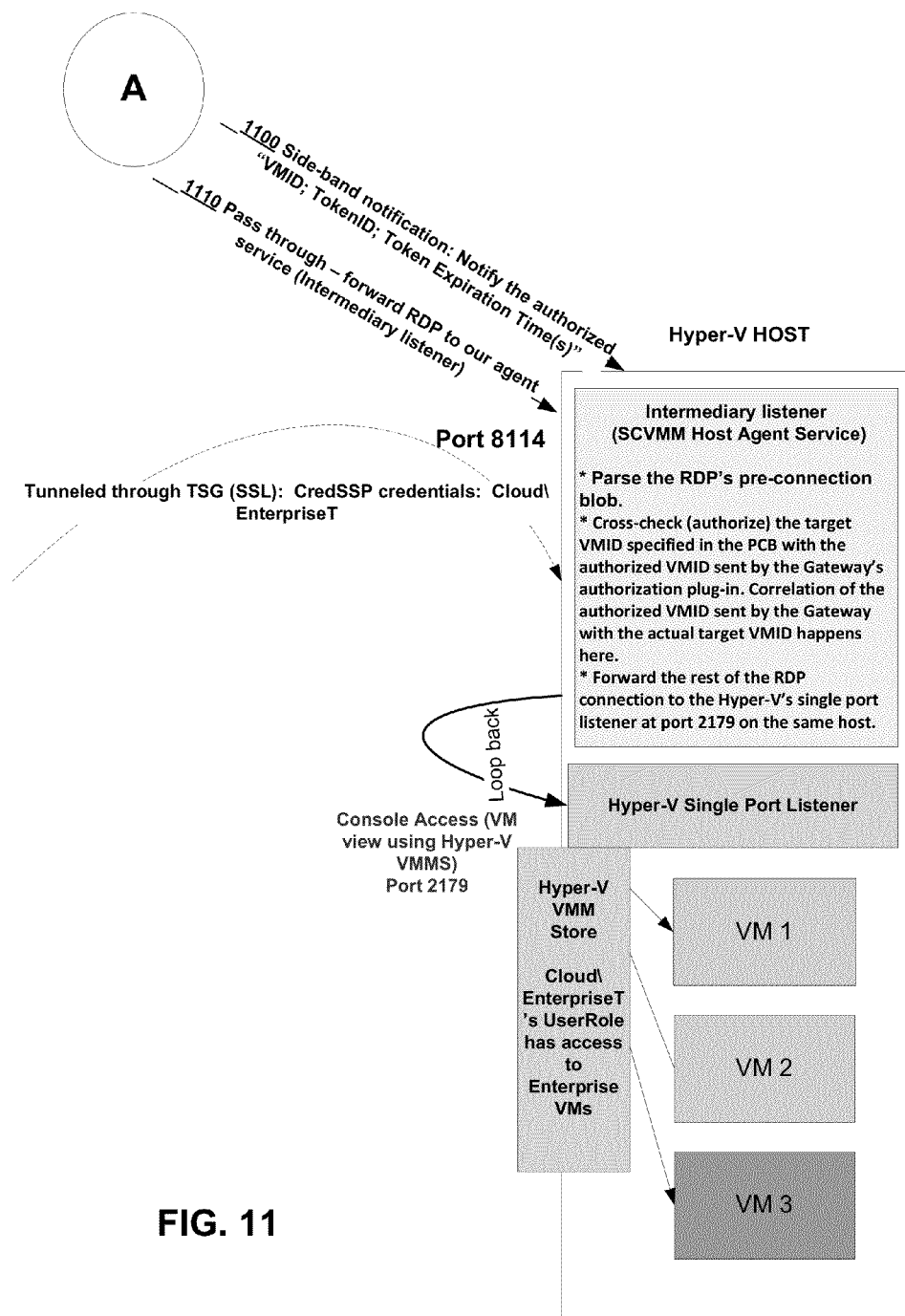

With reference to FIGS. 9 through 11, the following illustrative example is provided to depict one embodiment of the present disclosure. Let us assume that virtual machines VM1 and VM2 of the Cloud domain are assigned to the enterprise ("Enterprise") by the cloud provider ("Cloud"). The enterprise administrator assigns VM1 to Enterprise\User1 and VM2 to Enterprise\User2.

In this example, a client refers to the Enterprise remote presentation client. The Enterprise remote presentation client can be an administrator console. In an embodiment, the console can be a process or an Active-X control loaded into the self service portal's page.

CloudProvider creates two user accounts in its Active Directory per enterprise that has purchased capacity from it. Illustrating with example let "Cloud\Enterprise" be the user account created in the Cloud domain for the administrator of Enterprise. "Cloud\Enterprise" is not shared by the Enterprise administrator to all the end users of Enterprise. Let "Cloud\EnterpriseT" be another user account created in the Cloud domain for the sole purpose of console access to all of the virtual machines owned by the Enterprise. "Cloud\EnterpriseT" has only "consoleaccess" privileges (enforced by the Virtualization Host, e.g., Hyper-V using AzMan) to all the virtual machines owned by this specificEnterprise in the Cloud provider's domain.

Virtualization Host's Virtual Machine Management System (single port listener) mandates authenticating incoming connections using the CredSSP protocol. Enterprise end user's client needs to use the user account "Cloud\EnterpriseT" for authenticating at the CloudProvider's virtualization host using the CredSSP protocol. This credential is handed to the client by the Enterprise Virtual Machine Management system along with the signed token. Credential SSP is a Security Support Provider that provides Single-Sign-On (SSO). It is important to note that the end user does not enter this credential explicitly, but it is handled automatically by the client after communicating with the Enterprise Virtual Machine Management system. More importantly, in our case, this authentication mechanism imposed by Single Port Listener is useless because we do not want a user of the enterprise getting access to a VM belonging to even another user of the same enterprise. Our primary authentication and authorization mechanism is using signed tokens. Nevertheless this does serve as an additional defense layer in protecting one enterprise tenant from another different enterprise.

1. Referring to FIG. 9, in operation 900 Enterprise\User1 uses an application programming interface (API) to talk to the Enterprise virtualization manager server to identify itself as Enterprise\User1 and present a claim requesting authorization for access to VM1. Communication between the client and the Enterprise virtualization manager server is a secured channel. In an embodiment, the API can be the Windows Communication Foundation (WCF) which is an API in the .NET Framework for building connected service-oriented applications.
2. In operation 910, the Enterprise virtualization manager server performs authentication by verifying the identity of Enterprise\User1.
3. In operation 920, the Enterprise virtualization manager server performs authorization by verifying that Enterprise\User1 has access to VM1.
4. In operation 930, once authenticated and authorized, the Enterprise virtualization manager server signs the claim using a certificate trusted by a Cloud service provider (signed using a private key). The certificate's private key is not shared by the Enterprise administrator to all users of the Enterprise and is only known to the virtualization manager server. The signed token is returned to the client.
    a. The Enterprise client also retrieves the terminal services gateway server for the service provider from the Enterprise virtualization manager server.
    b. The Enterprise client uses the virtual machine ID as the host alias. The Enterprise client does not know the real host name/IP address. The Enterprise client forwards this alias as the host name to the terminal services gateway.
    c. In one embodiment, the token contains a data block, signature block, and the tenant certificate with just the public key. The data block of the token contains the Tenant ID, Token ID, Token Expiration time, and authorized target virtual machine ID. An expiration time and other countermeasures are provided to avoid a common attack to the service providers network called a replay attack. The signature block contains a hash of the data block signed using the private key of the tenant certificate. The tenant certificate is also included, but contains just the public key.
    d. The Enterprise client encodes the token. The Enterprise client sets up the parameters of the remote presentation connection, indicating to the gateway that it wants to use cookie-based authorization. In an embodiment, the pre-connection blob contains the string "<Token ID>; <virtual machine ID>." The remote presentation client is set to use CredSSP with credentials of "Cloud\EnterpriseT".

A cookie is a generally data comprising text and stored by a user's web browser or in memory. A cookie can be used for authentication, storing site preferences, shopping cart contents, the identifier for a server-based session, or anything else that can be accomplished through storing text data.

5. In operation 940, the Enterprise client connects to the terminal services gateway over an HTTPS tunnel specifying the destination virtualization server and the destination port of the intermediary listener (e.g., 8114). The Enterprise client also sends the signed token to the gateway as a cookie.
    a. When using the STS server approach, the Enterprise client sends the SAML token to the gateway. The Enterprise client obtains the SAML token after authentication between the Enterprise and Cloud provider's STS servers. This requires setting up granular trust levels between the Enterprise and the Cloud Active Directory environments.
6. Referring to FIG. 10, in operation 1000 the terminal services gateway's custom authentication plug-in receives the signed token and verifies that the token is not tampered. The authentication plug-in uses the public key of the certificate.
    a. When using the STS server approach, the STS server verifies the signed SAML token with the Cloud ADFS server. ADFS is a component that provides Web single-sign-on (SSO) technologies to authenticate a user to multiple Web applications over the life of a single online session.
7. In operation 1010, the terminal services gateway's custom authentication plug-in verifies that the tenant certificate maps to a user account in the Cloud provider's domain.
8. In operation 1020, the terminal services gateway's custom resource authorization plug-in receives the signed token.
   a. In one embodiment, a host level authorization is performed.
   b. In another embodiment, the authorization plug-in queries the cloud provider virtualization manager server to check if the tenant has access to the virtual machine based on the claims in the token.
9. The terminal services gateway's custom resource authorization plug-in will be unable to perform full virtual machine level authorization since the remote presentation protocol's pre-connection blob is not exposed by the terminal services gateway because it is unable to cross-check signed claims in the signed token with the actual destination.
10. The terminal services gateway calls a plug-in to resolve the aliased host name since the alias cannot be resolved by the native windows DNS provider. In operation 1030, the cloud provider's virtualization manager server is contacted to find the real host where this virtual machine resides at this point in time.
11. Once the host is determined, the custom authorization plugin can notify an intermediary listening service in the target virtualization host about the target virtual machine ID and token ID to be authorized. A Windows Management Instrumentation (WMI) provider may be written in the host. The WMI provider will control authorization and communication.
   a. Once the terminal services gateway performs authentication and authorization, the gateway now becomes a blind pass through between the client connection and the destination intermediary listener at the virtualization host.
12. Referring to FIG. 11, in operation 1100 the intermediary listener in the virtualization host receives the "side band information" from the terminal services gateway's custom authorization plug-in.
13. In operation 1110 the intermediary listener in the virtualization host receives the remote presentation connection from the terminal services gateway. The intermediary listener opens the pre-connection blob (the first set of bytes of the connection) and cross-checks the target virtual machine ID specified in the blob with the authorized virtual machine ID received as a side-band notification from the terminal services gateway's custom resource authorization plug-in. Correlation of the authorized virtual machine ID sent by the gateway with the actual target virtual machine ID is performed using the token ID present in both. Unlike in a typical virtual desktop session, the end user has no credentials to send to the virtual machine for the session. Accordingly, a token is used to validate access through an intermediary service.
   a. If the virtual machine ID does not match, the connection is dropped.
   b. If the virtual machine ID matches, the rest of the connection is blindly forwarded to the virtualization host's single port listener in the same host (e.g., port 2179).
   c. Each token contains the expiration time (e.g., in seconds). The intermediary listening service also manages the side-band notifications by pruning old notifications.
14. The virtualization host's single port listener then checks if Cloud\EnterpriseT (determined using CredSSP) has access to that virtual machine based on the user role policies in an authorization store xml.
15. If successful, Enterprise user has console access to that virtual machine.

Authorization can be performed either at the terminal services gateway or at the destination host or both. However, full authorization at the terminal services gateway is typically not possible. The terminal services gateway's custom resource authorization plug-in needs to have access to the pre-connection blob for that connection, and thus the terminal services gateway's custom resource authorization plug-in is not suited for console access to guest virtual machines through the virtualization host's single port listener.

Accordingly, in an embodiment authorization is performed at the virtualization host. Since a shadow account cannot be created for each user of the enterprise in the cloud provider's Active Directory, one option is to create a local account for each virtual machine in the local host. That local account would be shared with the enterprise end users and would only be authorized to access the console session of the virtual machine. Alternatively, if it is not desirable to manage numerous local user accounts, (this needs to be managed out of band between Hoster and Enterprise virtual machine management systems), which could be a concern for cloud providers, then the intermediary listener approach may be used.

The intermediary listener service in the virtualization system host can either be a separate service (network service) or part of an existing host agent (local system account). In order to secure the side-band notifications from the terminal services gateway to the intermediary service in the host, the intermediary listener may use a WMI provider.

If a malicious user changes the token ID, the signature on the token may be invalidated. The token ID in the signed token and the pre-connection blob must correlate.

Malicious User Scenario 1:
   a. Enterprise\User1 is authorized access to virtual machine VM1. The user's token ID is t1.
   b. Malicious user in the Enterprise does not have access to that virtual machine. The malicious user obtains a token for some other virtual machine but subsequently changes the pre-connection blob to point to virtual machine VM1 and token ID to t1 in both the pre-connection blob and the cookie and attempting to piggy back on the side-band authorization notification that would have been sent by the gateway to the virtualization host for Enterprise\User1.
   c. Mitigation: Gateway's authentication plug-in detects that the signature is invalid in the cookie and drops the connection.

Malicious User Scenario 2:
   a. Enterprise\User1 is authorized access to virtual machine VM1 and the user's token ID is t1.
   b. The malicious user in the Enterprise does not have access to that virtual machine. The malicious user obtains a token for some other virtual machine, say virtual machine VM2 with token ID t2. The malicious user changes the PCB to point to virtual machine VM1 with token ID as t1, but keeps the token ID in the cookie as t2. Since the malicious user has not changed the token in the cookie, the signature is still valid. The gateway sends token ID t2 as the authorized token ID to the containing host. If the same host contained the virtual machine with ID virtual machine VM1, and if another user of the Enterprise was authorized to virtual machine VM1, then this malicious user can piggy back on the side-band authorization notification that would have been sent by the gateway to the virtualization host for Enterprise\User1.

c. Mitigation:
i. The channel from the remote presentation client to the tenant virtualization manager server is encrypted, so there is no way for the user to obtain the token ID t1 granted for Enterprise\user1.
ii. The pre-connection blob can be signed by the tenant's private key as well, so that the cloud provider can validate the signature with the tenant's public key.

Figure 12:
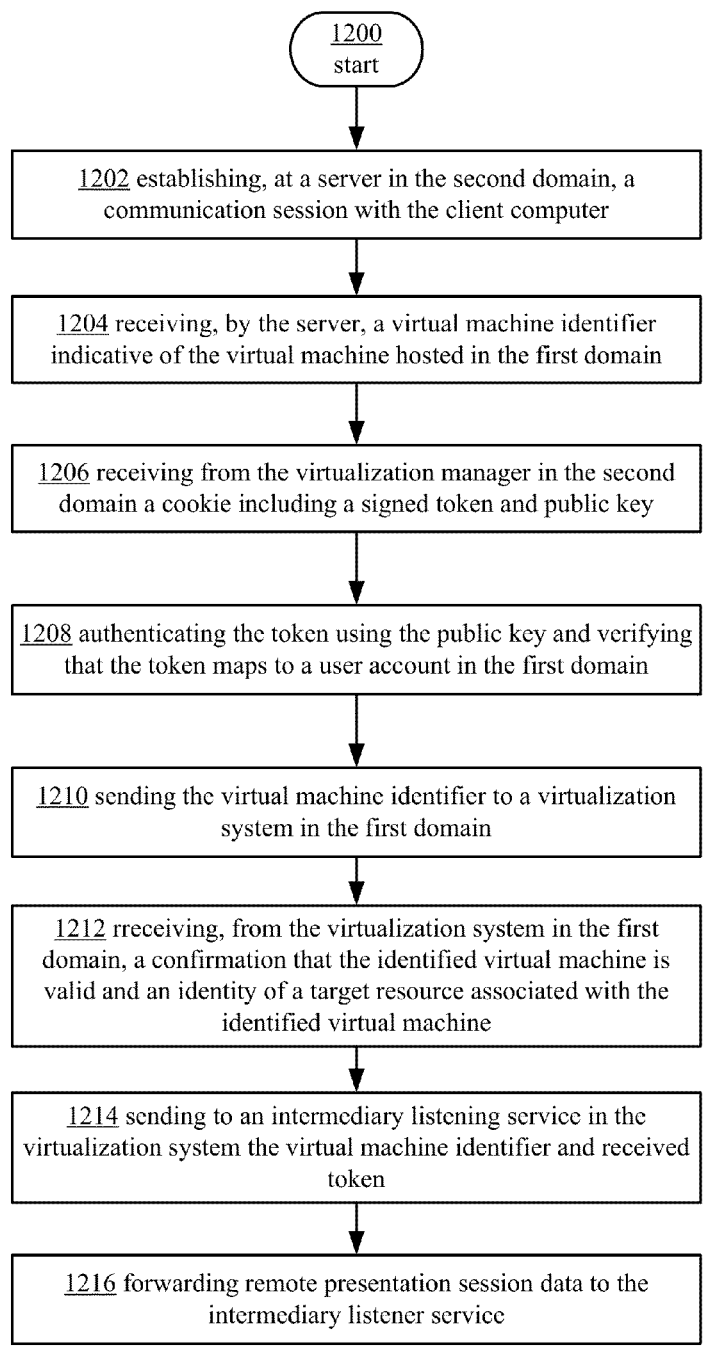
FIG. 12 illustrates an example operational procedure for practicing aspects of the present disclosure.

FIG. 12 depicts an exemplary operational procedure for allowing a remote presentation session between a virtual machine hosted in a first domain and a client computer in a second domain including operations 1200, 1202, 1204, and 1206. Referring to FIG. 12, operation 1200 begins the operational procedure and operation 1202 illustrates establishing, at a server in the first domain, a communication session with the client computer. In one embodiment, the first domain may be a cloud provider or the hoster, and the second domain may be an enterprise. Operation 1204 illustrates receiving, by the server, a virtual machine identifier indicative of the virtual machine hosted in the first domain. Operation 1206 illustrates receiving from the client computer a cookie including a signed token and public key. In an embodiment, the cookie is constructed by the client based on the signed token received by it from the Enterprise Virtual Machine Management system. Operation 1208 illustrates authenticating the token using the public key and verifying that the token maps to a user account in the first domain. Operation 1210 illustrates sending the virtual machine identifier to a virtualization system in the first domain. Operation 1212 illustrates receiving, from the virtualization system in the first domain, a confirmation that the identified virtual machine is valid and an identity of a target resource associated with the identified virtual machine. Operation 1214 illustrates sending to an intermediary listening service in the virtualization system the virtual machine identifier and received token. Operation 1216 illustrates forwarding remote presentation session data to the intermediary listener service.

Figure 13:
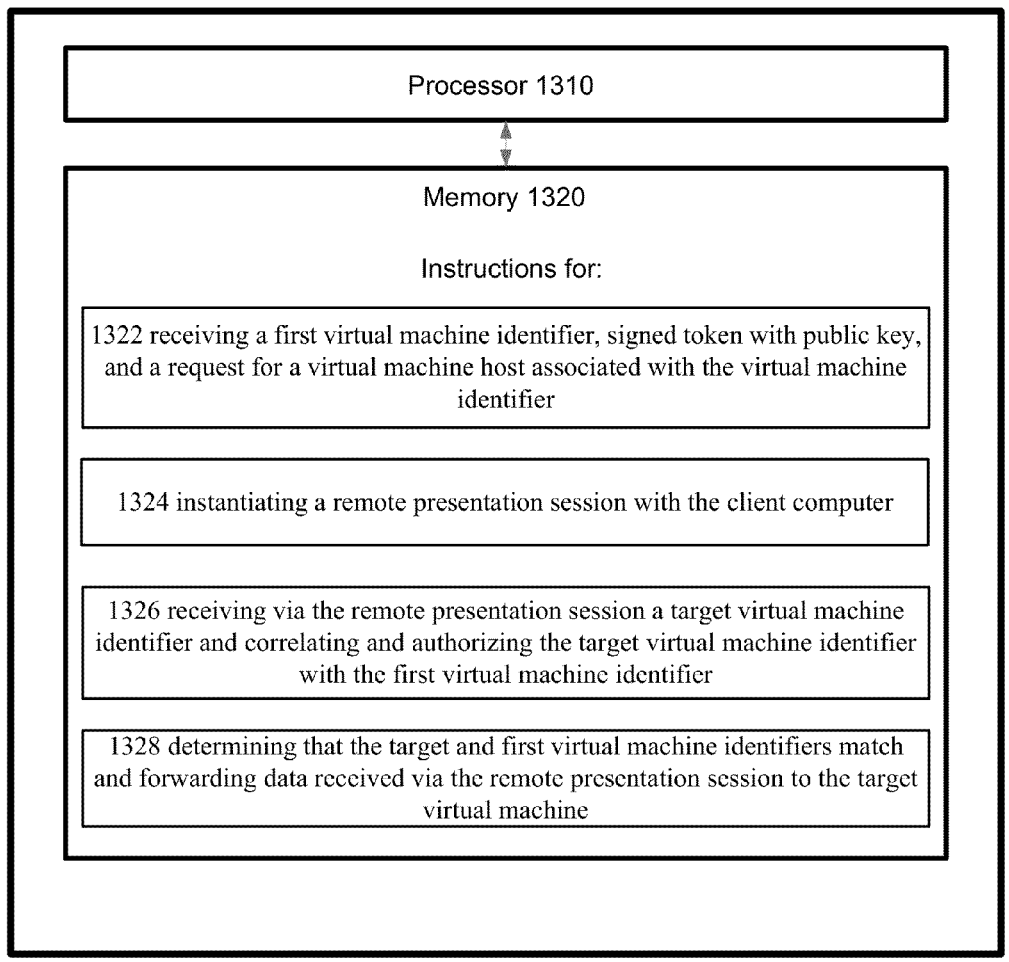
FIG. 13 illustrates an example system and operational procedure for practicing aspects of the present disclosure.

FIG. 13 depicts an exemplary system for allowing access to a virtual machine hosted in a first domain to a client computer in a second domain as described above. Referring to FIG. 13, system 1300 comprises a processor 1310 and memory 1320. Memory 1320 further comprises computer instructions configured to allow access to a virtual machine hosted in a first domain to a client computer in a second domain. Block 1322 illustrates receiving a first virtual machine identifier, signed token with public key, and a request for a virtual machine host associated with the virtual machine identifier. Block 1324 illustrates instantiating a remote presentation session with the client computer. Block 1326 illustrates receiving via the remote presentation session a target virtual machine identifier and correlating and authorizing the target virtual machine identifier with the first virtual machine identifier. Block 1328 illustrates determining that the target and first virtual machine identifiers match and forwarding data received via the remote presentation session to the target virtual machine.

Any of the above mentioned aspects can be implemented in methods, systems, computer readable media, or any type of manufacture. For example, a computer readable medium can store thereon computer executable instructions for accessing a virtual machine hosted in a first domain by a client computer in a second domain. Such media can comprise a first subset of instructions for establishing a communication session with a virtualization host in the first domain; a second subset of instructions for sending to a virtualization host in the first domain a virtual machine identifier and a claim requesting authorization for access to the identified virtual machine; a third subset of instructions for receiving a signed token from the virtualization manager in the second domain; a fourth subset of instructions for establishing a remote presentation session through the virtualization host in the first domain and sending an indication that a cookie-based authorization will be performed; a fifth subset of instructions for sending to the virtualization host in the first domain a cookie including a signed token and public key; and a sixth subset of instructions for establishing a remote presentation session with the requested virtual machine. It will be appreciated by those skilled in the art that additional sets of instructions can be used to capture the various other aspects disclosed herein, and that the two presently disclosed subsets of instructions can vary in detail per the present disclosure.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. A method for allowing a remote presentation session between a virtual machine hosted in a first domain in a cloud computing environment and a client computer in a second domain outside of the cloud computing environment, the method comprising:

establishing, at a server in the second domain, a communication session with the client computer;

receiving, by the server, a virtual machine identifier indicative of the virtual machine hosted in the first domain;

receiving from a virtualization manager in the second domain a cookie including a signed token and public key;

authenticating the token using the public key and verifying that the token maps to a user account in the first domain;

sending the virtual machine identifier to a virtualization system in the first domain;

receiving, from the virtualization system in the first domain, a confirmation that the identified virtual machine is valid and an identity of a target resource associated with the identified virtual machine;

sending to an intermediary listening service in the virtualization system the virtual machine identifier and received token, the intermediary listening service configured to cross-check the virtual machine identifier with an authorized virtual machine identifier received as a side-band notification; and forwarding remote presentation session data to the intermediary listener service.

2. The method of claim 1, wherein said establishing further comprises establishing a connection with the client computer over an HTTPS tunnel specifying a destination virtualization server and a destination port of the intermediary listening service.

3. The method of claim 1, further comprising performing a host level authorization.

4. The method of claim 1, further comprising querying, by an authorization plug-in executing on the server, the virtualization system to determine that the client computer is authorized to access the virtual machine based on the token.

5. The method of claim 1, wherein said first domain is a cloud service provider.

6. The method of claim 1, wherein said second domain is an enterprise providing its users access to virtual machines hosted by a cloud service provider.

7. The method of claim 1, wherein the signed token includes a tenant ID, token ID, token expiration time, and authorized target virtual machine ID.

8. A system for allowing access to a virtual machine hosted in a first domain of a computing environment hosted by a data center to a client computer in a second domain, the client computer accessing leased or purchased computing resources provided by the computing environment, comprising:

a computing device comprising at least one processor;

a memory communicatively coupled to said processor when said system is operational; said memory having stored therein computer instructions that upon execution by the at least one processor cause:

receiving a first virtual machine identifier, signed token with public key, and a request for a virtual machine host associated with the first virtual machine identifier;

instantiating a remote presentation session with the client computer;

receiving via the remote presentation session a target virtual machine identifier and correlating and authorizing the target virtual machine identifier with the first virtual machine identifier; and determining that the target and first virtual machine identifiers match and forwarding data received via the remote presentation session to the target virtual machine, wherein the first virtual machine identifier and the signed token are sent to an intermediary listening service configured to cross-check the first virtual machine identifier with an authorized virtual machine identifier received as a side-band notification.

9. The system of claim 8, wherein said forwarding comprises forwarding the data via the remote presentation session at a single port listener in the first domain.

10. The system of claim 8, wherein said correlating and authorizing further comprises determining that the first virtual machine has access to the target virtual machine based on user role policies in an authorization store XML.

11. The system of claim 10, wherein said determining is performed using CredSSP.

12. The system of claim 8, further comprising allowing console access to the target virtual machine.

13. The system of claim 8, wherein said first domain is a cloud service provider.

14. The system of claim 8, wherein the signed token includes a tenant ID, token ID, token expiration time, and authorized target virtual machine ID.

15. A computer readable storage medium storing thereon computer executable instructions for accessing a virtual machine hosted in a first domain by a client computer in a second domain, said instructions for:

establishing a communication session with a virtualization host in the first domain;

sending to a virtualization host in the first domain a virtual machine identifier and a claim requesting authorization for access to the identified virtual machine;

receiving a signed token from a virtualization manager in the second domain;

establishing a remote presentation session through the virtualization host in the first domain and sending an indication that a cookie-based authorization will be performed;

sending to the virtualization host in the first domain a cookie including a signed token and public key, wherein a virtual machine identifier and the signed token are sent to an intermediary listening service configured to cross-check the virtual machine identifier with an authorized virtual machine identifier received as a side-band notification; and establishing a remote presentation session with the identified virtual machine.

16. The computer readable storage medium of claim 15, wherein said establishing a communication session further comprises establishing a connection with a server in the first domain over an HTTPS tunnel specifying a virtualization server in the first domain and a destination port of the intermediary listening service.

17. The computer readable storage medium of claim 15, wherein the signed token includes a tenant ID, token ID, token expiration time, and authorized target virtual machine ID.

18. The computer readable storage medium of claim 15, wherein said second domain is an enterprise providing an end user with access to virtual machines hosted by a cloud service provider.

19. The computer readable storage medium of claim 15, wherein said token is signed with a X.509 certificate.

20. The computer readable storage medium of claim 15, wherein said token is a SAML token.

* * * * *